(12) United States Patent
Sobel et al.

(10) Patent No.: US 8,578,006 B2
(45) Date of Patent: Nov. 5, 2013

(54) ENABLING SELECTIVE POLICY DRIVEN PROPAGATION OF CONFIGURATION ELEMENTS BETWEEN AND AMONG A HOST AND A PLURALITY OF GUESTS

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 13/074,850

(22) Filed: Mar. 29, 2011

(65) Prior Publication Data
US 2012/0254380 A1 Oct. 4, 2012

(51) Int. Cl.
*G06F 15/173* (2006.01)
(52) U.S. Cl.
USPC .......................................... 709/221; 709/224
(58) Field of Classification Search
USPC .................................. 709/221, 224
See application file for complete search history.

(56) References Cited

U.S. PATENT DOCUMENTS

| 7,552,445 | B2 * | 6/2009 | Green ........................... 719/318 |
| 2005/0120160 | A1 * | 6/2005 | Plouffe et al. ..................... 711/1 |
| 2006/0112342 | A1 | 5/2006 | Bantz et al. |
| 2008/0189468 | A1 | 8/2008 | Schmidt et al. |
| 2010/0287455 | A1 * | 11/2010 | Tripathi et al. ............... 714/807 |

OTHER PUBLICATIONS

PCT International Search Report and Written Opinion for Counterpart Application PCT/US12/30997 dated Jun. 29, 2012, 10 pages.

\* cited by examiner

*Primary Examiner* — Adnan Mirza
(74) *Attorney, Agent, or Firm* — Brill Law Office; Jeffrey Brill

(57) ABSTRACT

Configuration elements are selectively propagated between a host and multiple guests, based on a policy. Configuration elements of the host and guests are monitored. Changes made to monitored configuration elements are detected. It is determined whether to propagate changed configuration elements between operating system environments based on the policy. It can be determined to propagate changed configuration element(s) from a source to one or more destinations in response to factors such as the identity and/or classification of the source, or the type, attribute(s), content and/or identity of the changed configuration element(s). The creation of new guests is detected. In response, at least one configuration element from at least one source is automatically propagated to a newly created guest.

20 Claims, 4 Drawing Sheets

ENABLING SELECTIVE POLICY DRIVEN PROPAGATION OF CONFIGURATION ELEMENTS BETWEEN AND AMONG A HOST AND A PLURALITY OF GUESTS

TECHNICAL FIELD

This disclosure pertains generally to virtual machines and configuration elements, and more specifically to enabling selective propagation of configuration elements between and among a host and a plurality of guests.

BACKGROUND

In the world of virtual computing, multiple virtual machines (VMs or guests) can be instantiated at a software level on a single physical computer (host computer). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

It is becoming increasingly common for users to run multiple virtual machines on a single host computer. For example, in a virtualization environment, it is possible for virtual machines to run different operating systems than the host. Many Mac users find it convenient to run a Windows guest on their Mac host, in order to run programs that are best suited for (or only available on) Windows. A common example is the use of Outlook to access corporate email from Exchange. While there are native Mac alternatives, the latest and best integrated email features tend to be superior on Windows applications.

In addition, using separate guests to house different application sets can be useful, on either a Mac or Windows (or other) host. This technique enables the creation of a separate "virtual appliance" for each application set, in which the operating system environment within the guest running the application set is specifically tuned to maximize performance and meet the needs of that application set. Fine tuning for multiple application sets within a single operating system environment can result in conflicts. Such conflicts can be avoided by using this virtual appliance approach, in which each application set runs in its own guest, thereby keeping the operating system environments separated. This not only reduces the risk of conflict or interference between environments, but provides a level of granularity that can be extremely convenient.

Another example in which multiple virtual machines are run on a computer is within the context of a software development environment. It is desirable for developers to use virtual machines to keep different development environments separated from one another and from the primary, host operating system.

Useful though they are, running multiple virtual machines on a host creates certain burdens for the user. For example, each time a user configures a computer (physical or virtual), the user typically goes through an involved process of customization and personalization of various operating system and application settings (e.g., setting favorites, configuring menus, setting preferences, etc.). Each time the user sets up a new virtual machine on the host, the user has to go through this process yet again, which is burdensome and repetitive. Currently, the entire customization process a user has already gone through to configure the primary, host computer has to be repeated for each and every virtual computer the user runs on that host.

It would be desirable to address these issues.

SUMMARY

A configuration propagation management system enables selective propagation of configuration elements between and among a host having an operating system environment and a plurality of guests, each guest having an operating system environment, based on a policy. A policy indicating configuration elements to be propagated between sources and destinations under various conditions is maintained. Configuration elements of the host and some or all of the guests are monitored. Changes made to monitored configuration elements are detected. It is determined whether to propagate changed configuration elements between operating system environments, based on the policy. It can be determined to propagate one or more specific changed configuration element(s) originating from a source operating system environment to at least one destination operating system environment, in response to factors such as the identity and/or classification of the source operating system environment, or the type, attribute(s), content and/or identity of the one or more specific changed configuration element(s).

Propagating specific changed configuration element(s) from the source operating system environment to one or more destination operating system environment(s) can further comprise propagating specific changed configuration element(s) from the host to some or all of the guests, from a specific guest to the host and/or from a first specific guest to a second specific guest. In some embodiments, the creation of new guests is detected, and at least one configuration element from at least one source is automatically propagated to a newly created guest. In some embodiments, configuration elements are propagated from a source with a first operating system to a destination with a second, different operating system. In this case, the configuration elements being propagated from the first operating system are mapped into comparable configuration elements in the second, different operating system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
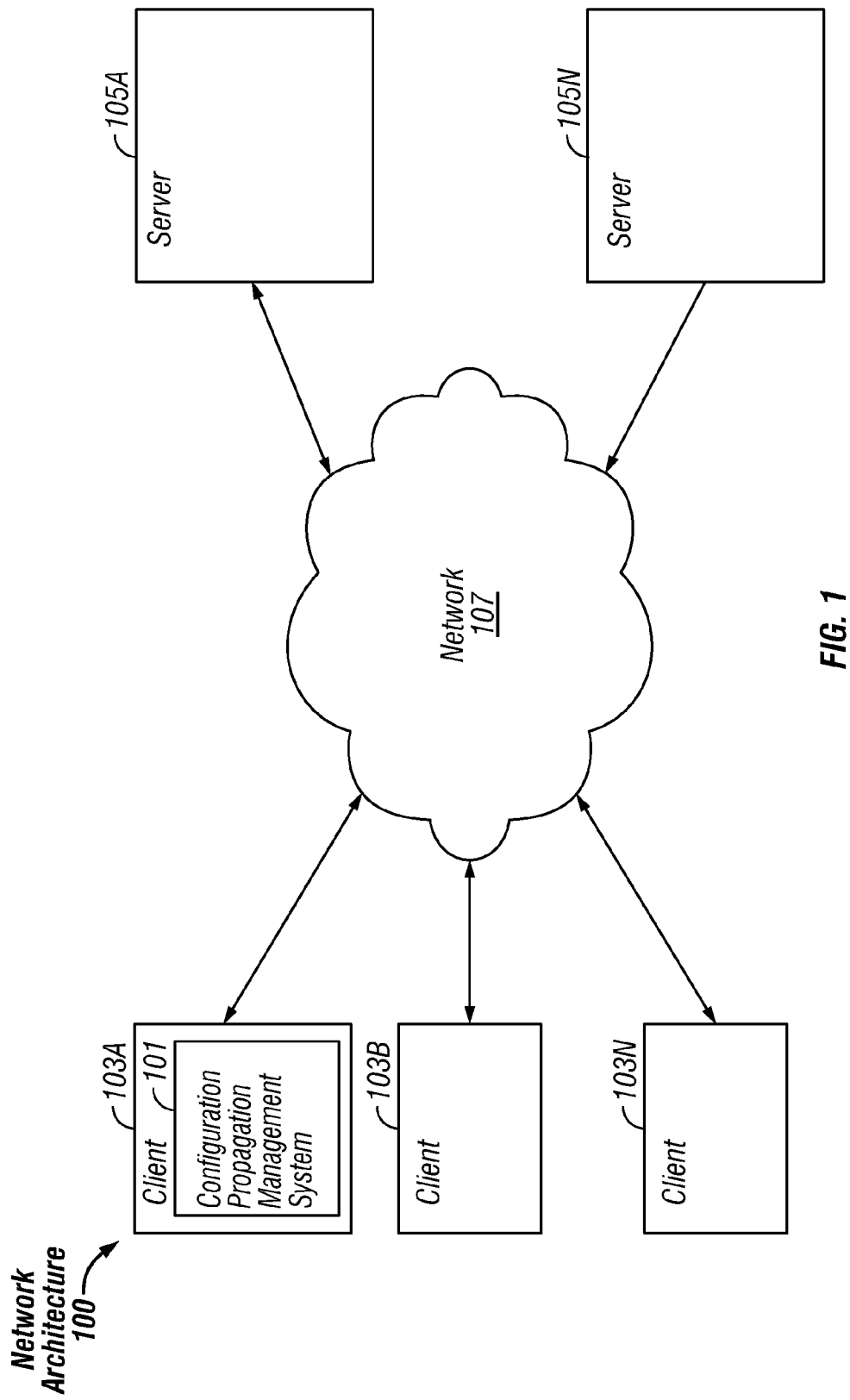
FIG. 1 is a block diagram of an exemplary network architecture in which a configuration propagation management system can be implemented, according to some embodiments.

FIG. 1 is a block diagram illustrating an exemplary network architecture 100 in which a configuration propagation management system 101 can be implemented. The illustrated network architecture 100 comprises multiple clients 103A, 103B and 103N, as well as multiple servers 105A and 105N. In FIG. 1, the configuration propagation management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
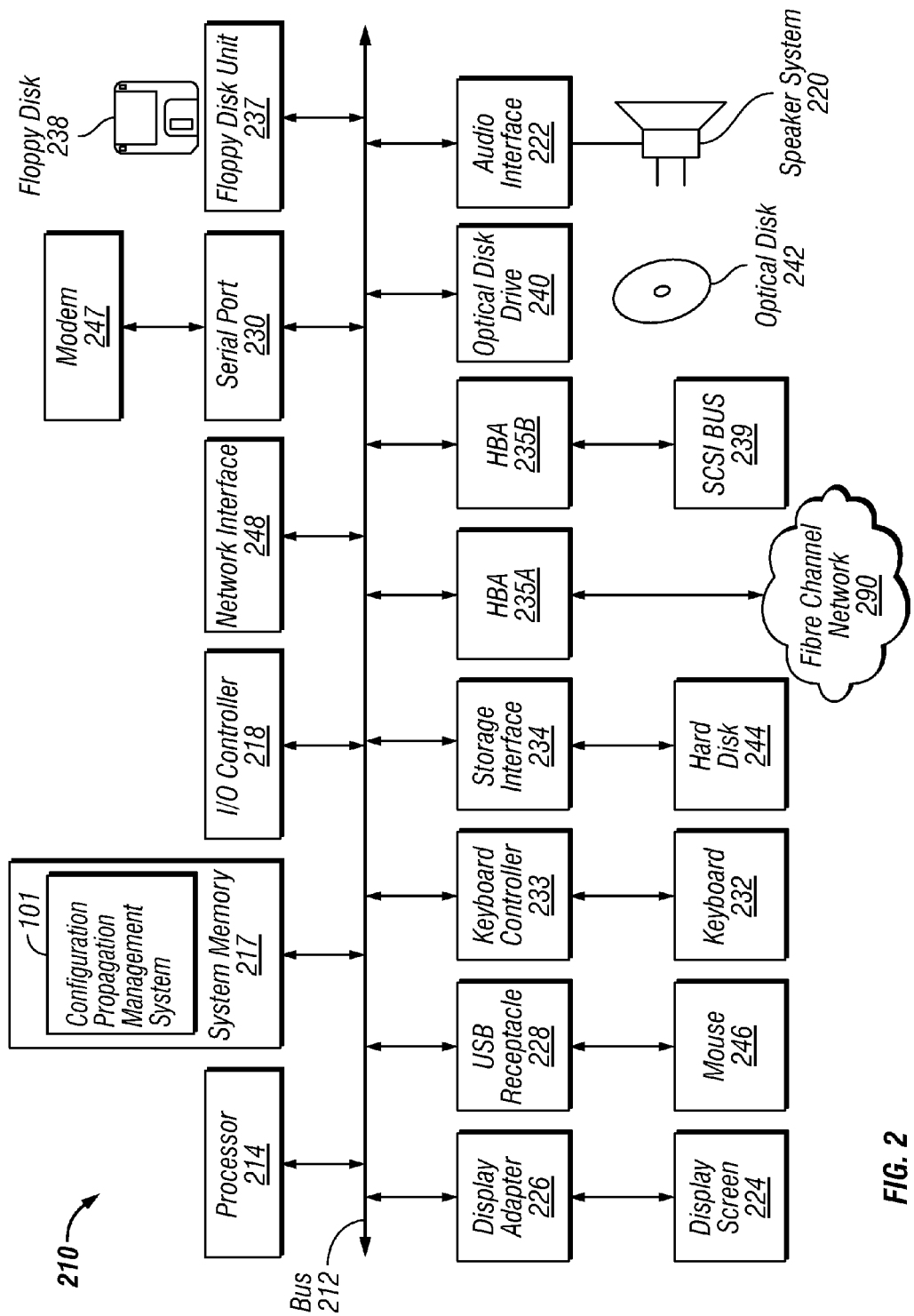
FIG. 2 is a block diagram of a computer system suitable for implementing a configuration propagation management system, according to some embodiments.

FIG. 2 is a block diagram of a computer system 210 suitable for implementing a configuration propagation management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the configuration propagation management system 101 is illustrated as residing in system memory 217. The workings of the configuration propagation management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
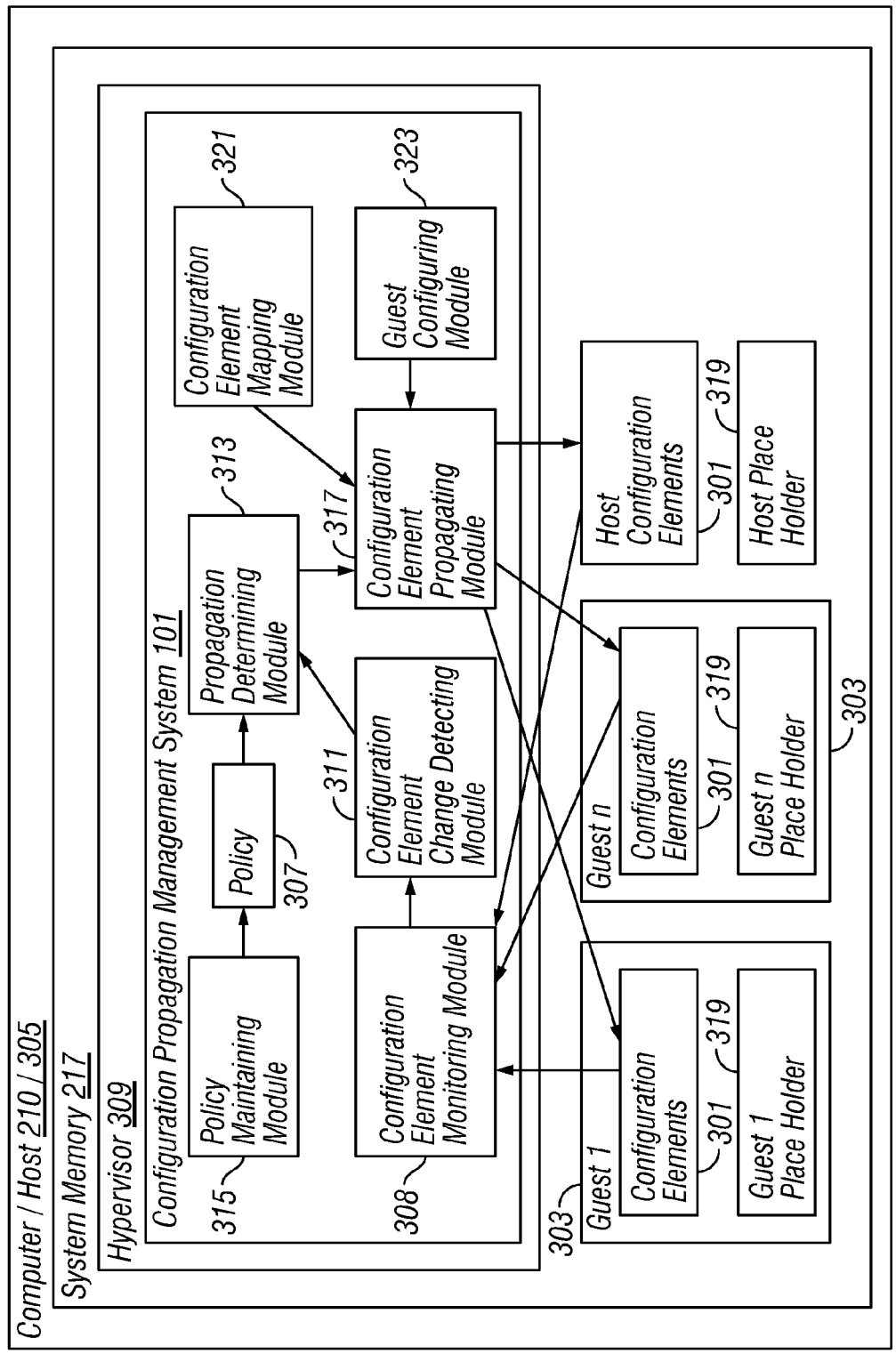
FIG. 3 is a block diagram of the operation of a configuration propagation management system, according to some embodiments.

FIG. 3 illustrates the operation of a configuration propagation management system 101 residing in the system memory 217 of a computer 210, according to some embodiments. As described above, the functionalities of the configuration propagation management system 101 can reside on a client 103, a server 105, or be distributed between multiple computer systems 210, including within a cloud-based computing environment in which the functionality of the configuration propagation management system 101 is provided as a service over a network 107. It is to be understood that although the configuration propagation management system 101 is illustrated in FIG. 3 as a single entity, the illustrated configuration propagation management system 101 represents a collection of functionalities, which can be instantiated as a single or multiple modules as desired (an instantiation of specific, multiple modules of the configuration propagation management system 101 is illustrated in FIG. 3). It is to be understood that the modules of the configuration propagation management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the configuration propagation management system 101 can be stored on non-transitory computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the configuration propagation management system 101 enables selective bidirectional propagation of configuration elements 301 between the host 303 and any guest 305 provisioned for use thereon, and/or between multiple guests 305. As explained in more detail below, configuration elements 301 can be propagated from their originating operating system environment into another operating system environment according to a configurable policy 307. The policy 307 can specify which configuration elements 301 are to be propagated from which environments to which other environments under what circumstances. As used herein, "operating system environment" means a host 305 or guest 303 as configured, with a given operating system and set of configuration elements 301.

The policy 307 can specify rules governing configuration element 301 propagation at a source, context, content and/or destination level. Configuration elements 301 can be propagated from the host 305 to a guest 303, from one guest 303 to another and/or from a guest 303 to the host 305, according to the policy 307. The policy can specify which configuration elements 301 are to be propagated between which guests 305 and/or the host 303, and the direction(s) in which these propagations are to occur. The policy 307 can also specify which configuration elements 301 to propagate from which source (s) into newly created guests 305 under what circumstances.

As illustrated in FIG. 3, in some embodiments the configuration propagation management system 101 runs at a hypervisor 309 level. As illustrated, multiple guests 303 (virtual machines) and a hypervisor 309 run in the computer memory 217 of a host 305, which can be in the form of a physical computer 210, for example of the type illustrated in FIG. 2. In FIG. 3, only two guests 303 are shown for illustrative purposes, but in practice many more can be deployed. The host 305 and each guest 303 have their own configuration elements 301. It is to be understood that as used herein, the term "configuration element 301" means an element of an operating system, computer system 210 or application that is configurable by a user, such as user preferences and other settings (e.g., Windows task/tool bar layout, start menu preferences, Explorer folder view detail level preferences, browser bookmarks, word processor menu settings, default printer and print settings, network settings, etc.).

A configuration element monitoring module 308 of the configuration propagation management system 101 monitors the configuration elements 301 of the host 305 and the guests 303. Well-established operating systems such as Windows, variants of Unix/Linux and Mac OS have standardized, defined structures for storing configuration elements 301. For example, under Windows many configuration elements 301 such as user preferences and application settings are stored in the registry, and/or in specific files in standard folder locations (e.g., \Users\<username>\AppData\ etc.). On Mac OS, many configuration elements 301 such as application settings are stored in files underneath a user's Preferences Directory (e.g., ~Library/Preferences for specific users, Library/Preferences for computer-wide settings). Unix/Linux variants use a similar convention (e.g., ~/.software/settings.cnf etc.). Runtime frameworks such as Java and .NET also have documented mechanisms for storing and retrieving user and computer level settings.

The configuration element monitoring module 308 monitors the structures at which configuration elements 301 are stored on the host 305 and the guests 303 (e.g., registries, appropriate files/folders, etc). A configuration element change detecting module 311 of the configuration propagation management system 101 detects changes made to monitored configuration elements 301. When the configuration element change detecting module 311 detects a change made to a configuration element 301, a propagation determining module 313 of the configuration propagation management system 101 determines whether to propagate the changed configuration element 301 to any other operating system environments (i.e., to any of the guests 303 or the host 305). To make this determination, the propagation determining module 313 reads the policy 307, which specifies what types of configuration elements 301 are to be propagated from which sources to which destinations under which conditions. The propagation determining module 313 determines whether to propagate the changed configuration element 301 based on the policy 307.

Concerning the policy 307, a policy maintaining module 315 of the configuration propagation management system 101 maintains the policy 307. In some embodiments, a default policy 307 is provided with the configuration propagation management system 101. In some embodiments, the policy 307 can be edited or configured by a system administrator, IT professional, user and/or other individuals. In some embodiments, default policy 307 updates can be distributed, e.g., over the Internet from a server 105 (not illustrated).

The policy 307 can specify propagation directives at any desired level of granularity. The policy 307 can define unidirectional and/or bidirectional configuration element 301 propagation paths between the host 305 and specific guests 303 and between multiple ones of the specific guests 303. In other words, configuration elements 301 can be propagated according to origin and/or destination as desired. In addition to or instead of defining specific guests 303 of origin and/or destination, the policy can also specify arbitrary guest 303 names with wildcards (e.g., "Dev-*").

The policy 307 can also specify conditions under which configuration elements 301 are to be propagated. For example, the policy can specify to filter configuration elements 301 to propagate by application, by folder in which the application is stored, or according to arbitrary name and/or path of the application (e.g., "*:\*\Microsoft Office\*.exe"). In addition to applications, the policy can specify to propagate configuration elements 301 concerning particular subsystems of an operating system, such as the file system, or certain hardware components such as the display.

Additionally, the policy 307 can specify to propagate configuration elements 301 according to identity, attributes and/ or content of the configuration elements 301 themselves. Examples of this include Windows task/tool bar layouts, start menu preferences, browser favorites, etc.

A walk through of several specific examples of possible policy 307 directives for configuration element 301 propagation should be helpful to understand the types of scenarios that the configuration propagation management system 101 enables. As noted above, specific guests 303 are often used as development environments. It is not uncommon for a developer to treat a development environment as his/her primary work environment, and to customize the development environment to optimize it for development work. It is likely desirable to propagate these customizations to other development environments (e.g., other guests 303 used for development) or even to the host 305. Thus, the policy 307 could specify to propagate any (or specific ones or types of) changes made to all (or specific ones/types) of configuration element(s) 301 between guests 303 classified as development environments.

Another example would be for the policy to specify to propagate configuration element 301 changes between guests 303 classified as production environments, as well as the host 305 (which can be classified as a production environment). Note that individual guests 303 and/or the host 305 can be classified as belonging to one or more than one type of environment (e.g., development environment, production environment, testing environment, etc.).

Another example of a policy 307 directive for configuration element 301 propagation is to propagate configuration elements 301 from the host 305 to all guests 303. It is to be understood that the above examples are illustrative only, and in various embodiments the policy 307 can specify various other factors according to which to determine whether to propagate specific configuration elements 301 according to origin, destination, context, circumstances, element content or other attributes and/or combinations of these factors. It is also to be understood that whereas the policy 307 can specify to propagate certain configuration elements 301 between certain operating system environments, so too can the policy 307 (explicitly or implicitly) indicate not to propagate certain configuration elements 301 under certain circumstances.

Where the propagation determining module 313 determines to propagate one or more changed configuration elements 301 from one operating system environment to at least one other operating system environment based on the policy 307, a configuration element propagating module 317 of the configuration propagation management system 101 propagates the changed configuration element(s) 301 from the source operating system environment to the destination operating system environment(s). As discussed above, the configuration element propagating module 317 can propagate configuration elements 301 from the host 305 to one or more guests 303, from one guest to one or more other guests 303 and/or from a guest 303 to the host 305.

The configuration element propagation module 317 is able to propagate configuration elements 301 from any guest 303 to the host 305 or any other guest 303 because it is running at a hypervisor level 309. As explained below, the configuration element propagation module 317 is also able to propagate configuration elements 301 from the host 305 to any guest 303.

In one embodiment, the propagation of configuration elements 301 is implemented via place holders 319 running on the host 305 and on each guest 303. When propagating configuration elements 301, the place holder 319 on the source component can communicate with the place holder 319 on the target component. In the example of propagating configuration elements 301 from a guest 303 (source) to the host 305 (target), the updates to the configuration elements 301 that were changed on the guest 303 are transmitted by the guest's place holder 319 to the host's place holder 319. The host's place holder 319 then makes the appropriate updates to propagate to the host 305 the detected changes to the guest's configuration elements 301. This same process works for propagation between multiple guests 303. For propagation from the host 305 to a guest 303, the above-described process is reversed (i.e., the host's place holder 319 transmits updates to the configuration elements 301 that were changed on the host 305 to the guest's place holder 319, which updates the guest's configuration elements 301 accordingly to propagate the modifications). It is to be understood that in some embodiments, the place holders 319 communicate with one another via the hypervisor 309, but in other embodiments place holder 319 to place holder 319 communication is done in other ways, for example via conventional TCP/IP sockets. It is to be understood that as used herein the term "place holder" 319 simply means a process having the above-described functionality.

In some embodiments, whenever a new guest 303 is created on the host 305, a guest configuring module 323 of the configuration propagation management system 101 detects the creation of the new guest 303. The guest configuring module 323 automatically configures the newly created guest 303 according to the configuration elements 301 of, e.g., the host 303 or another guest 303, with the same operating system and/or classification as the newly created guest 303. Thus, customizations and settings associated with specific operating systems and/or classifications are automatically propagated to new guests 303. The guest configuring module 323 uses the above described configuration element 301 propagation functionality to automatically propagate all (or specific ones) of the configuration element 301 settings of the source component (e.g., the host 305) to the newly created guest 303. The policy 307 can specify what source configuration elements 301 are to be propagated to which newly created guests 303 under which circumstances. The policy 307 can specify to configure newly created guests 303 at any level of granularity.

In some embodiments, configuration elements 301 from one operating system (e.g., Windows XP running on one guest 303) are propagated into another operating system (e.g., Windows 7 or Mac OS running on another guest 303). In such cases, a configuration element mapping module 321 of the configuration propagation management system 101 maps configuration elements 301 being propagated from the first operating system into equivalent or comparable configuration elements 301 in the second operating system. For example, various settings and preferences can have different names and storage locations between operating systems, yet equivalent or comparable functionality. In some embodiments, the configuring element mapping module 321 maintains mappings of equivalent and comparable configuration elements 301 between operating systems, and uses these maintained mappings to perform the above describe functionality during propagation of configuration elements 301 between different operating systems.

Figure 4:
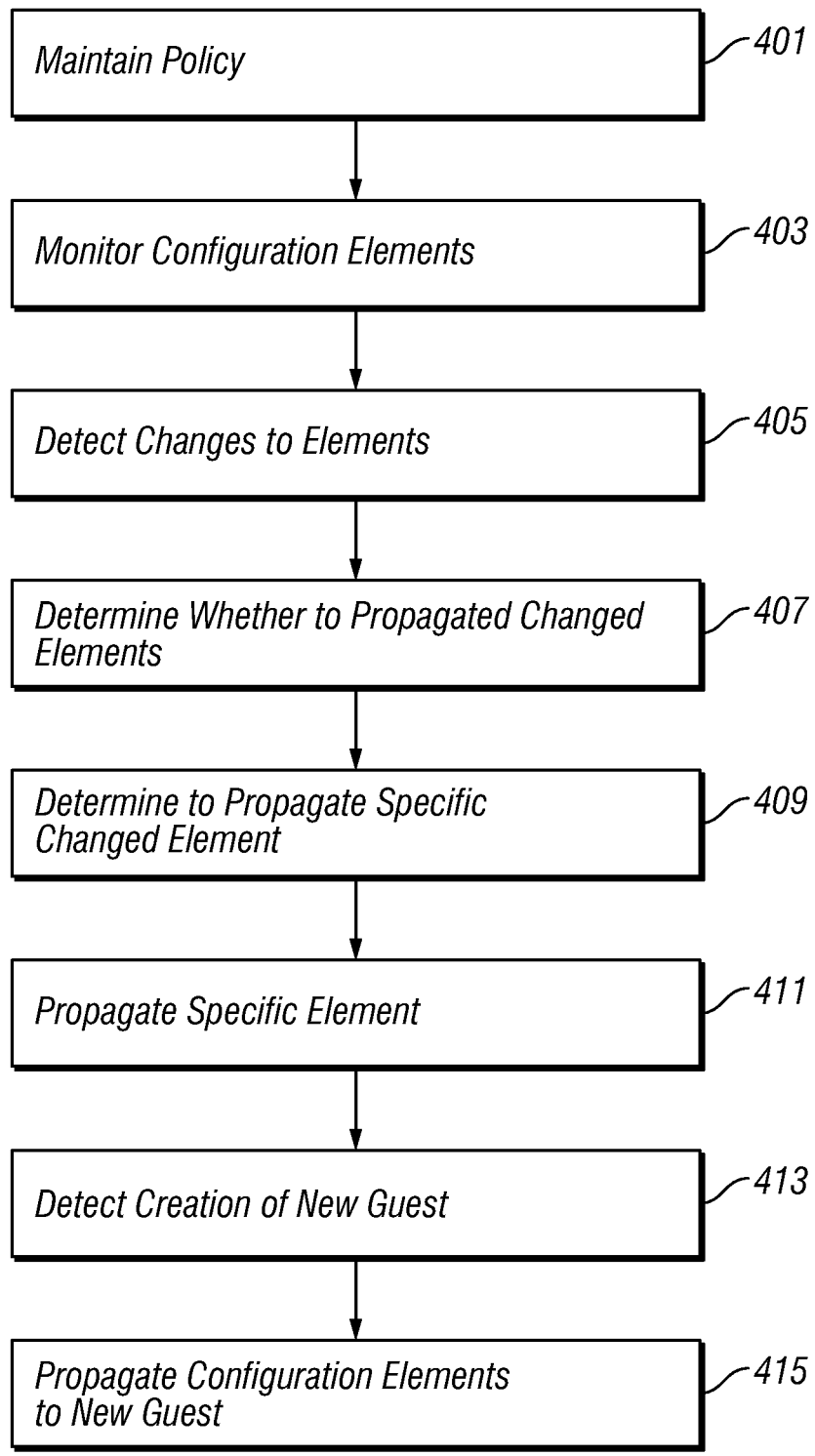
FIG. 4 is a flowchart of the operation of a configuration propagation management system, according to some embodiments.

FIG. 4 illustrates steps of the operation of the configuration propagation management system 101 (FIG. 1), according to some embodiments. The policy maintaining module 315 (FIG. 3) maintains 401 the policy 307 (FIG. 3) indicating configuration elements 301 (FIG. 3) to be propagated between sources and destinations under conditions. The configuration element monitoring module 308 (FIG. 3) monitors 403 the configuration elements 301 (FIG. 3) of the host 305 (FIG. 3) and the guests 303 (FIG. 3). The configuration element change detecting module 311 (FIG. 3) detects 405 changes made to monitored configuration elements 301 (FIG. 3). The propagation determining module 313 (FIG. 3) determines 407 whether to propagate changed configuration elements 301 (FIG. 3) between operating system environments, based on the policy 307 (FIG. 3). The propagation determining module 313 (FIG. 3) determines 409 to propagate at least one specific changed configuration element 301 (FIG. 3) originating from a source operating system environment to at least one destination operating system environment. In responsive to this determination, the configuration element propagating module 317 (FIG. 3) propagates 411 the specific changed configuration element(s) 301 (FIG. 3) from the source operating system environment to the destination operating system environment(s). The guest configuring module 323 (FIG. 3) detects 413 the creation of new guests 303 (FIG. 3), and automatically propagates 415 one or more configuration elements 301 (FIG. 3) from at least one source to the newly created guest 303 (FIG. 3).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for enabling selective propagation of configuration elements between and among a host having an operating system environment and a plurality of guests, each guest having an operating system environment, based on a policy, the method comprising the steps of:
    monitoring, by a computer, configuration elements of the host and of at least some guests of the plurality;
    detecting, by the computer, changes made to at least one of the monitored configuration elements;
    determining, by the computer, whether to propagate changed configuration elements between operating system environments, based on a policy indicating configuration elements to be propagated between sources and destinations under conditions;
    determining, by the computer, to propagate, based on the policy, at least one specific changed configuration element originating from a source operating system environment to at least one destination operating system environment;
    mapping the at least one specific changed configuration element from the source operating system environment to at least one comparable configuration element from the destination operating system environment, wherein a source operating system of a host differs in type from at least one of the destination operating systems of at least one guest; and
    responsive to determining to propagate the at least one specific changed configuration element originating from the source operating system environment to the at least one destination operating system environment, propagating, by the computer, the at least one specific changed configuration element from the source operating system environment to the at least one destination operating system environment.

2. The method of claim 1 wherein monitoring, by the computer, configuration elements of the host and of at least some guests of the plurality further comprises:
    monitoring, by the computer, configuration elements of the host and of all of the guests of the plurality.

3. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least a source of the at least one specific changed configuration element.

4. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least an identity of the source operating system environment.

5. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least a classification of the source operating system environment.

6. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least a type of the at least one specific changed configuration element.

7. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least one attribute of the at least one specific changed configuration element.

8. The method of claim 1 wherein determining, by the computer, to propagate, based on the policy, the at least one specific changed configuration element originating from the source operating system environment to the at least one destination operating system environment further comprises:
    determining, by the computer, to propagate, based on the policy, the at least one specific changed configuration element originating from the source operating system environment to the at least one destination operating system environment, responsive to at least content of the at least one specific changed configuration element.

9. The method of claim 1 wherein determining, by the computer, to propagate, based on the policy, the at least one specific changed configuration element originating from the source operating system environment to the at least one destination operating system environment further comprises:

determining, by the computer, to propagate, based on the policy, the at least one specific changed configuration element originating from the source operating system environment to the at least one destination operating system environment, responsive to at least an identity of the at least one specific changed configuration element.

10. The method of claim 1 further comprising:

maintaining, by the computer, the policy indicating configuration elements to be propagated between sources and destinations under conditions.

11. The method of claim 1 wherein propagating, by the computer, the at least one specific changed configuration element from the source operating system environment to the at least one destination operating system environment further comprises:

propagating, by the computer, the at least one specific changed configuration element from the host to each guest of the plurality.

12. The method of claim 1 wherein propagating, by the computer, the at least one specific changed configuration element from the source operating system environment to the at least one destination operating system environment further comprises:

propagating, by the computer, the at least one specific changed configuration element from a specific guest to the host.

13. The method of claim 1 wherein propagating, by the computer, the at least one specific changed configuration element from the source operating system environment to the at least one destination operating system environment further comprises:

propagating, by the computer, the at least one specific changed configuration element from a first specific guest to a second specific guest.

14. The method of claim 1 further comprising:

detecting, by the computer, a creation of a new guest; and
    automatically propagating at least one configuration element from at least one source to the newly created guest.

15. The method of claim 1 further comprising:

propagating configuration elements from a source with a first operating system to a destination with a second, different operating system; and
    mapping the configuration elements being propagated from the first operating system into comparable configuration elements in the second, different operating system.

16. At least one non-transitory computer readable medium storing a computer program product for enabling selective propagation of configuration elements between and among a host having an operating system environment and a plurality of guests, each guest having an operating system environment, based on a policy, the computer program product comprising:

program code for monitoring configuration elements of the host and of at least some guests of the plurality;
    program code for detecting changes made to at least one of the monitored configuration elements;
    program code for determining whether to propagate changed configuration elements between operating system environments, based on a policy indicating configuration elements to be propagated between sources and destinations under conditions;
    program code for determining to propagate, based on the policy, at least one specific changed configuration element originating from a source operating system environment to at least one destination operating system environment;
    program code for mapping the at least one specific changed configuration element from the source operating system environment to at least one comparable configuration element from the destination operating system environment, wherein a source operating system of a host differs in type from at least one of the destination operating systems of at least one guest; and
    program code for, responsive to determining to propagate the at least one specific changed configuration element originating from the source operating system environment to the at least one destination operating system environment, propagating the at least one specific changed configuration element from the source operating system environment to the at least one destination operating system environment.

17. The computer program product of claim 16 wherein the program code for determining to propagate, based on the policy, the at least one specific changed configuration element originating from the source operating system environment to the at least one destination operating system environment further comprises:

program code determining to propagate, based on the policy, the at least one specific changed configuration element originating from the source operating system environment to the at least one destination operating system environment, responsive to at least one factor from a group of factors consisting of:
    at least one specific changed configuration element;
    an identity of the source operating system environment;
    a classification of the source operating system environment;
    a type of the at least one specific changed configuration element;
    at least one attribute of the at least one specific changed configuration element;
    content of the at least one specific changed configuration element; and
    an identity of the at least one specific changed configuration element.

18. The computer program product of claim 16 wherein the program code for propagating the at least one specific changed configuration element from the source operating system environment to the at least one destination operating system environment further comprises:

program code for propagating the at least one specific changed configuration element from the host to each guest of the plurality.

19. The computer program product of claim 16 further comprising:

program code for detecting a creation of a new guest; and
    program code for automatically propagating at least one configuration element from at least one source to the newly created guest.

20. A computer system for enabling selective propagation of configuration elements between and among a host having an operating system environment and a plurality of guests, each guest having an operating system environment, based on a policy, the computer system comprising:

a processor;
    system memory;
    a configuration element monitoring module residing in the system memory, the configuration element monitoring module to monitor configuration elements of the host and of at least some guests of the plurality;

a configuration element change detecting module residing in the system memory, the configuration element change detecting module being configured for detecting changes made to at least one of the monitored configuration elements;

a propagation determining module residing in the system memory, the propagation determining module to determine whether to propagate changed configuration elements between operating system environments, based on a policy indicating configuration elements to be propagated between sources and destinations under conditions, the propagation determining module to map the at least one specific changed configuration element from the source operating system environment to at least one comparable configuration element from the destination operating system environment, wherein a source operating system of a host differs in type from at least one of the destination operating systems of at least one guest; and a configuration element propagating module residing in the system memory, the configuration element propagating module, responsive to determining to propagate the at least one specific changed configuration element originating from the source operating system environment to the at least one destination operating system environment, to propagate the at least one specific changed configuration element from the source operating system environment to the at least one destination operating system environment.

* * * * *